US012778371B2

(12) United States Patent
Tabeling et al.

(10) Patent No.: US 12,778,371 B2
(45) Date of Patent: Nov. 3, 2026

(54) SUCTION FOOT ASSEMBLY FOR A FLOOR CLEANING MACHINE

(71) Applicant: Hako GmbH, Bad Oldesloe (DE)

(72) Inventors: Christian Tabeling, Stockelsdorf (DE); Gerd Stahlkopf, Büchen (DE); Heinrich Katenhusen, Bad Oldesloe (DE)

(73) Assignee: Hako GmbH, Bad Oldesloe (DE)

( * ) Notice: Subject to any disclaimer, the term of this patent is extended or adjusted under 35 U.S.C. 154(b) by 275 days.

(21) Appl. No.: 18/143,928

(22) Filed: May 5, 2023

(65) Prior Publication Data

US 2023/0363606 A1 Nov. 16, 2023

(30) Foreign Application Priority Data

May 10, 2022 (DE) .................... DE102022111607.7

(51) Int. Cl.
*A47L 11/30* (2006.01)
*A47L 5/30* (2006.01)
(Continued)

(52) U.S. Cl.
CPC ................. *A47L 11/30* (2013.01); *A47L 5/30* (2013.01); *A47L 7/0023* (2013.01); *A47L 9/009* (2013.01);
(Continued)

(58) Field of Classification Search
CPC .......... A47L 11/30; A47L 5/30; A47L 7/0023; A47L 9/009; A47L 11/4016; A47L 11/4055; A47L 11/4072; F16B 2/02
See application file for complete search history.

(56) References Cited

U.S. PATENT DOCUMENTS 4,006,506 A * 2/1977 Burgoon ............. A47L 11/4055 15/320
5,579,555 A * 12/1996 Pearse ................. A47L 11/4044 15/98
(Continued)

FOREIGN PATENT DOCUMENTS

CN 205225552 U 5/2016
CN 109222776 A * 1/2019 .............. A47L 11/30
(Continued)

OTHER PUBLICATIONS

European Search Report mailed Oct. 12, 2023 for corresponding European Application No. 23172068.1 filed May 8, 2023.
(Continued)

*Primary Examiner* — Marc Carlson
(74) *Attorney, Agent, or Firm* — REISING ETHINGTON, P.C.

(57) ABSTRACT

A suction foot assembly having a suction foot with a suction foot holder, a coupling portion, and a suction foot interface. One of the coupling portion and a coupling end of the suction foot interface has a pin portion. The other of the coupling portion and the coupling end has first and second clamping elements that are mutually opposite, have free ends, and run concavely in such a manner that a receptacle portion in which the pin portion is received is formed between the clamping elements. The mutual spacing of the free ends of the clamping elements is less than the spacing of the clamping elements in the receptacle portion. One or both clamping elements is/are elastically deformable to permit the pin portion to be moved by way of the free ends out of the receptacle portion and into the latter.

15 Claims, 6 Drawing Sheets

(51) Int. Cl.
*A47L 7/00* (2006.01)
*A47L 9/00* (2006.01)
*A47L 11/40* (2006.01)
*F16B 2/02* (2006.01)

(52) U.S. Cl.
CPC ....... *A47L 11/4016* (2013.01); *A47L 11/4055* (2013.01); *A47L 11/4072* (2013.01); *F16B 2/02* (2013.01)

(56) References Cited

U.S. PATENT DOCUMENTS

| | | | | |
|---|---|---|---|---|
| 6,427,285 | B1 * | 8/2002 | Legatt | A47L 11/4036 15/325 |
| 6,895,633 | B2 * | 5/2005 | Tucker | A47L 11/4044 15/401 |
| 2002/0017006 | A1 | 2/2002 | Lijzenga | |
| 2003/0233729 | A1 * | 12/2003 | Tucker | A47L 11/4036 15/401 |
| 2005/0193519 | A1 * | 9/2005 | Joynt | A47L 11/30 15/401 |
| 2016/0120385 | A1 * | 5/2016 | Nortrup | A47L 11/4077 15/320 |
| 2017/0100011 | A1 * | 4/2017 | Waller | A47L 11/4044 |
| 2022/0257079 | A1 * | 8/2022 | Schmückle | A47L 11/4002 |
| 2022/0409002 | A1 * | 12/2022 | Protz | A47L 11/4038 |
| 2022/0409003 | A1 * | 12/2022 | Protz | A47L 11/4038 |
| 2023/0139346 | A1 | 5/2023 | Liu et al. | |
| 2023/0363606 | A1 * | 11/2023 | Tabeling | A47L 11/4055 |

FOREIGN PATENT DOCUMENTS

| | | | | | |
|---|---|---|---|---|---|
| CN | 209346922 | U | | 9/2019 | |
| CN | 110664326 | A | * | 1/2020 | A47L 11/4094 |
| CN | 111513633 | A | * | 8/2020 | A47L 11/4055 |
| CN | 113069049 | A | | 7/2021 | |
| CN | 216256947 | U | * | 4/2022 | A47L 11/40 |
| DE | 4141711 | A1 | * | 6/1993 | A47L 11/305 |
| DE | 4200064 | A1 | * | 7/1993 | A47L 11/4027 |
| DE | 4202987 | A1 | * | 8/1993 | A47L 11/4044 |
| DE | 10221353 | A1 | * | 11/2003 | A47L 11/30 |
| DE | 10305611 | A1 | * | 8/2004 | A47L 11/4044 |
| DE | 102005054499 | A1 | * | 5/2007 | A47L 11/4044 |
| DE | 202013103571 | U1 | * | 9/2013 | A47L 11/4061 |
| DE | 102017110774 | A1 | * | 11/2018 | A47L 11/30 |
| DE | 102018111499 | B3 | * | 8/2019 | A47L 11/4044 |
| EP | 1913859 | A1 | * | 4/2008 | A47L 11/4061 |
| EP | 2248455 | A1 | * | 11/2010 | A47L 11/4061 |
| EP | 2954817 | A1 | * | 12/2015 | A47L 11/4055 |
| EP | 3106566 | A1 | * | 12/2016 | A47L 11/4044 |
| EP | 3424397 | A1 | * | 1/2019 | A47L 11/40 |
| EP | 3510910 | A1 | * | 7/2019 | A47L 11/4055 |
| EP | 4179944 | A1 | * | 5/2023 | B01D 46/0015 |
| GB | 2306300 | B | * | 3/1999 | A47L 11/4058 |
| WO | WO-0024305 | A1 | * | 5/2000 | A47L 11/4041 |
| WO | WO-2009127836 | A1 | * | 10/2009 | A47L 11/4055 |
| WO | WO-2012107729 | A1 | * | 8/2012 | A47L 11/4044 |
| WO | WO-2013019823 | A1 | * | 2/2013 | A47L 11/30 |

OTHER PUBLICATIONS

Chinese Office Action for Chinese Application No. 202310519935.X dated Jun. 14, 2025 (8 pages).

Korean Office Action regarding corresponding Korean Application No. 10-2023-0060466, mailed Aug. 3, 2026.

* cited by examiner

SUCTION FOOT ASSEMBLY FOR A FLOOR CLEANING MACHINE

CROSS-REFERENCE TO RELATED APPLICATIONS

This application claims the benefit and priority of German Patent Application No. 10 2022 111 607.7, filed May 10, 2022, the disclosure of which is incorporated by reference as if fully set forth in detail herein.

FIELD

The present disclosure relates to a suction foot assembly for a floor cleaning machine.

BACKGROUND

Suction foot assemblies of this type are known from the prior art and are provided in floor cleaning machines which have a scrubbing deck in the region of which cleaning liquid is applied to a floor area to be cleaned, so as to release dirt on the floor area with the aid of the scrubbing deck. The suction foot, which in the direction of movement of the floor cleaning machine is disposed behind the scrubbing deck, with the aid of a vacuum source serves for discharging the waste liquid again from the floor area to be cleaned, said vacuum source being connected to a waste liquid tank in the floor cleaning machine.

To this end, it is known from the prior art that the suction foot of the floor cleaning machine is fastened to a machine-proximal suction foot interface by way of so-called handwheel screws. To this end, the suction foot interface has slots which are open towards the rear such that in the event of a collision of the suction foot with an object said suction foot, which laterally projects beyond the floor cleaning machine, is torn out of the suction foot interface and no damage to the components of the suction foot or of the mounting is caused. However, in order for the suction foot not to be released already while in motion, the operator has to apply a correspondingly high manual force when fastening the handwheel screws. In this context, it often arises, even if not intentionally, that tools are used for applying the corresponding force despite a tool-free operation having been envisaged for the daily cleaning of the suction foot.

In order to ensure the continuous contact of the suction foot over the full floor area to be cleaned even when negotiating uneven spots in the floor, and to nevertheless simultaneously maintain the position of the suction foot relative to the floor, trapezoidal joint constructions are often used for the mounting of the suction foot. However, these are often of a very complex construction.

SUMMARY

This section provides a general summary of the disclosure, and is not a comprehensive disclosure of its full scope or all of its features.

Proceeding from the prior art it is, therefore, the object of the present disclosure to provide a suction foot assembly which permits the suction foot to be fastened to the machine in an ideally simple manner without the use of tools, wherein the fastening is designed in such a manner that the latter is released in a self-acting manner without causing damage to the suction foot assembly when high forces arise.

This object can be achieved, for example, by a suction foot assembly for attaching to a floor cleaning machine, having a suction foot having a base to which are attached a front suction lip and a rear suction lip which, for example in a mutually parallel manner, extend away from the base and are mutually spaced apart in such a way that a suction chamber is delimited by the suction lips and the base; wherein the edges of the suction lips that are distal from the base extend in a contact plane and are configured to bear on a floor area to be cleaned; having a suction foot holder which is connected to the base and has a coupling portion; having a suction foot interface which extends between a coupling end and a machine end; wherein the machine end is configured to be attached to a floor cleaning machine, for example so as to be pivotable about a vertical axis; wherein one of the coupling portion and the coupling end has a pin portion which extends along a pin axis that runs parallel to the contact plane; wherein the other of the coupling portion and the coupling end has a first clamping element and a second clamping element which are mutually opposite, have free ends and run concavely in such a manner that a receptacle portion in which the pin portion is received is formed between the clamping elements; wherein the mutual spacing of the free ends of the clamping elements is less than the spacing of the clamping elements in the receptacle portion; and wherein one or both clamping elements is/are elastically deformable in such a manner that the pin portion can be moved, perpendicular to the direction of extent of the latter, by way of the free ends out of the receptacle portion and into the latter.

The suction foot assembly of the present disclosure can firstly have a base which, for example in a curved shape, can extend from a first end to a second end, and a front suction lip and a rear suction lip which, preferably in a mutually parallel manner, extend away from the base and moreover extend over the length of the base between the first end and the second end being attached to the base. Each of the suction lips, so as to be distal from the base, has an edge which is provided to bear on a floor area to be cleaned when waste liquid is to be discharged from the floor area to be cleaned while using the suction foot. The front suction lip is preferably embodied with slots so that slots extend away from the edge towards the base such that waste liquid situated in front of the front suction lip can make its way into the suction chamber formed between the suction lips, said suction chamber moreover being delimited by the base. In order for the suction chamber to be sealed in the best possible manner during operation, the edges of the suction lips are attached in such a manner that said suction lips extend in a common contact plane.

A suction foot holder can be provided on the base, the former having a coupling portion by way of which said suction foot holder can be connected to the coupling end of the suction foot interface, the latter likewise can be part of the suction foot assembly and can extend between the coupling end and the first machine end. The machine end of the suction foot assembly is designed in such a manner that said machine end can be attached to the machine housing or a scrubbing deck of a floor cleaning machine. The attachment is preferably designed such that the suction foot interface is pivotable relative to the machine housing or the scrubbing deck about a vertical axis, said vertical axis running perpendicularly to the contact plane and optionally also perpendicularly to the floor area to be cleaned, in particular when the suction foot is disposed on a floor area to be cleaned.

The connection between the suction foot holder and the suction foot interface can be designed in such a manner that the coupling portion of the suction foot holder, or the coupling end of the suction foot interface, has a pin portion which extends along a pin axis that runs parallel to the contact plane.

If the base extends from a first end to a second end, the pin axis can preferably run parallel to a connecting line which extends parallel to the contact plane between the ends of the base.

If the coupling portion has the pin portion a first clamping element and a second clamping element, which are elastically configured and are mutually opposite, are provided on the coupling end, such that a receptacle portion is configured between said clamping elements. When viewed from the respective other clamping element, the clamping elements run concavely so as to form the receptacle portion, and moreover have free ends in the region of which the spacing between the clamping elements is less than in the receptacle portion. Finally, at least one of the clamping elements can be elastically deformed in such a manner that the pin portion can be guided through the free ends into the receptacle portion, or out of the latter.

If the coupling end has the pin portion, clamping elements of this type can be provided on the coupling end portion.

It is thus possible that the suction foot holder and the suction foot interface can be connected to one another by “snap-fitting” the pin portion between the clamping elements, whereby the use of tools is not required. Moreover, this results in the advantage that, when forces that exceed a specific threshold act on the suction foot perpendicular to the pin portion and are caused by obstacles along which the floor cleaning machine having the suction foot assembly of the present disclosure is moving, the pin portion is released in a self-acting manner from the receptacle portion while deforming at least one of the clamping elements. As a result, the connection between the suction foot holder and the suction foot interface is released and damage to the suction foot when contacting an obstacle is prevented.

Finally, the connection between the suction foot holder and the suction foot interface is preferably designed in such a manner that the clamping elements are pivotable about the pin axis relative to the pin portion such that the vertical position of the suction foot relative to the suction foot interface is variable in a self-acting manner.

In one preferred embodiment, the pin portion is provided on the coupling end of the suction foot interface, and the coupling portion on the suction foot holder has the clamping elements. However, it is also conceivable that the clamping elements are also attached to the suction foot interface, and the pins are attached to the suction foot holder.

In one exemplary embodiment of the present disclosure, a plug-in member which extends along a first longitudinal axis is attached to one of the base and the suction foot holder; wherein on the other of the base and the suction foot holder is provided a holding portion in which a receptacle region is configured; wherein the plug-in member is received in the receptacle region and is in an inserted position; wherein the receptacle region is designed so that the latter extends along a second longitudinal axis; wherein the second longitudinal axis runs parallel to the contact plane; wherein the plug-in member and the receptacle region are designed in such a manner that the plug-in member for receiving in the receptacle region is able to be inserted into the receptacle region along the second longitudinal axis up to the inserted position which can be defined by a detent, wherein the first longitudinal axis and the second longitudinal axis coincide and the plug-in member in the inserted position is pivotable relative to the holding portion about the second longitudinal axis.

It is to be pointed out at this instance that the concept in which provided on one of the suction foot holder and the base of the suction foot is a plug-in member, and on the other is provided a holding portion having a receptacle region into which the plug-in member can be inserted up to an inserted position, and is then pivotably mounted in the receptacle region, is inventive on its own. This concept, and the embodiments thereof described hereunder, are thus not limited to being used on a suction foot assembly conjointly with the further aspects described herein. Rather, the concept consisting of the plug-in member and the receptacle region can very generally be used to pivotably attach a suction foot to a mounting provided for this purpose.

The connection between the suction foot, or the base of the latter, and the suction foot holder can be designed in such a manner that provided on one of the suction foot and the suction foot holder is a plug-in member which extends along a first longitudinal axis, while provided on the other of the suction foot and the suction foot holder is a holding portion having a receptacle region, for example in the form of a clearance, in which the plug-in member is received and therein assumes an inserted position. The receptacle region of the holding portion here is designed such that said receptacle region extends along a second longitudinal axis such that the first longitudinal axis and the second longitudinal axis coincide when the plug-in member is in the inserted position. Moreover, the receptacle region and the plug-in member are configured such that the plug-in member can be pivoted relative to the holding portion about the first longitudinal axis. Moreover, the plug-in member can be inserted along the second longitudinal axis into the receptacle region, preferably up to a detent, or be extracted from said receptacle region.

Finally, in this preferred embodiment the first longitudinal axis and the second longitudinal axis are disposed in such a manner that said longitudinal axes run parallel to the contact plane and parallel to the pin axis. In particular, the first longitudinal axis and/or the second longitudinal axis and the pin axis can be mutually spaced apart and parallel.

As a result of this arrangement and the pivoting capability of the plug-in member relative to the holding portion, the base of the suction foot can pivoted about a second axis such that the base is mounted so as to be not only variable in terms of the height relative to the suction foot interface, but also the orientation of the base of the suction foot relative to the floor area to be cleaned can be varied independently of the vertical position of the base relative to the suction foot interface.

Moreover, in this preferred embodiment the suction foot can be released from the suction foot holder and be reconnected to the latter in a simple manner. To this end, it is necessary only for the suction foot to be moved along the longitudinal axis and thus sideways by way of a movement, so that the plug-in member is extracted from the receptacle region, on the one hand. On the other hand, the suction foot for connecting can likewise be connected to the suction foot holder by way of a movement from the side, in that the plug-in member is inserted into the receptacle region.

In a further preferred embodiment the plug-in member has an interior, wherein one of the interior and the receptacle region is connected to the suction chamber, wherein (a) the other of the interior and the receptacle region is connected to a connector for a suction line, which is provided on the plug-in member or the holding portion, and in the inserted position the receptacle region is connected to the interior; or (b) the one of the interior and the receptacle region is connected to a connector for a suction line, which is provided on the plug-in member or the holding portion, and in the inserted position the receptacle region is preferably connected to the interior.

According to this preferred embodiment, the plug-in member has an interior, and when the plug-in member is attached to the base this interior is connected to the suction chamber of the suction foot that is formed between the suction lips and the base. In this instance, the receptacle region according to the first alternative of this embodiment can be connected to a connector for a suction line, wherein this connector is provided on the holding portion, and moreover the receptacle region and the interior are connected to one another. In this instance it is possible that a suction line which leads to the waste liquid tank is connected to the suction connector and the suction chamber by way of the connection between the plug-in member and the holding portion is then impinged with negative pressure, waste liquid being suctioned from the suction chamber.

If the plug-in member is attached to the base of the suction foot, it is provided in this preferred embodiment according to the second alternative that the plug-in member also has the suction connector. Also in this case, the plug-in member and the holding portion are utilized for discharging waste liquid from the suction chamber when the suction connector is connected to a discharge line.

In an alternative of this preferred embodiment the holding portion is attached to the base of the suction foot, and the suction chamber in this instance is connected to the receptacle region of the holding portion. According to the first alternative, the interior of the plug-in member is in this instance connected to a suction connector provided thereon, such that the suction chamber can in turn be impinged with negative pressure by way of the connection between the plug-in member and the holding portion. According to the second alternative, the holding portion in this instance also has the suction connector which is connected to the receptacle region. Also, in the case of this construction, the suction chamber is impinged with negative pressure by way of the connection between the plug-in member and the holding portion.

In this way, in the case of all alternatives of this preferred embodiment it is not necessary for an additional connection by way of which the suction chamber can be impinged with negative pressure to be provided between the base and the suction foot holder.

It can be provided in particular that the plug-in member is attached to the base and the interior of said plug-in member is connected to the suction chamber of the suction foot, wherein the plug-in member also has a suction connector which is likewise connected to the interior.

In the embodiment described above it is advantageous for the suction connector to be disposed on a first end face of the plug-in member that extends perpendicularly to the first longitudinal axis. In this instance, the suction connector is readily accessible to a user.

In a further preferred embodiment the suction foot assembly has a suction hose having a connector port, wherein the suction hose is configured to be connected indirectly or directly to a waste liquid tank of a floor cleaning machine; wherein the connector port and the suction connector are designed so that the connector port can be inserted into the suction connector, and in the inserted state can be pivoted relative to the suction connector about the first longitudinal axis; wherein the plug-in member on the suction connector has a first slot which extends through a wall of the plug-in member and which has a first locking portion that runs in a radial plane in relation to the first longitudinal axis; wherein the first slot towards the first end face has a first opening; wherein the holding portion has a second slot which is open towards a second end face of the holding portion, wherein the second end face points in the same direction as the first end face, and which has a second locking portion that runs in a radial plane in relation to the second longitudinal axis; wherein the first locking portion and the second locking portion overlap one another when the plug-in member is in the inserted position; wherein the connector port has a locking element which extends radially away therefrom; wherein the slots are designed in such a manner that the locking element, when inserting the connector port into the suction connector, by displacing and pivoting the connector port relative to the suction connector, can be moved into the first locking portion and the second locking portion.

In this preferred embodiment, a suction connector is provided on an end face of the plug-in member that runs perpendicularly to the first longitudinal axis, wherein the suction connector and a connector port of the suction connector hose are configured in such a manner that the connector port can be inserted into the suction connector and in the process can be pivoted about the first longitudinal axis. Furthermore provided on the connector port is a locking element which extends radially away therefrom.

Moreover, the plug-in member as well as the holding portion have in each case one slot, or one groove, said slots or grooves extending away from ends of the plug-in member, or of the holding portion, in the same direction as the first end face and comprising in each case one locking portion that runs in a radial plane in relation to the first longitudinal axis. These slots or grooves are furthermore attached in the plug-in member and the holding portion such that when the plug-in member is in the inserted position in the holding portion, said slots or grooves overlap in such a way that when the connector port is inserted into the suction connector it is possible for the locking element to be moved along the grooves or the slots in the plug-in member and the holding portion until said locking element has reached the locking portions. The locking element here is then disposed in the locking portion of the plug-in member as well as in that of the holding portion. Said locking element in this position prevents an axial relative movement between the plug-in member and the holding portion such that, when the connector port is inserted into the suction connector in the manner described, the plug-in member and the holding portion are axially locked in relation to one another and cannot be released.

The above object can be achieved, for example, by a floor cleaning machine having a running gear with wheels, so that the running gear is designed to be moved across a floor area to be cleaned, and having a machine housing, wherein provided on the machine housing is a scrubbing deck having cleaning elements for engaging with the floor area to be cleaned; and wherein the floor cleaning machine has a suction foot assembly according to one of the embodiments described above.

It is preferable here for the machine end of the suction foot assembly to be mounted on the scrubbing deck so as to be pivotable about a vertical axis, wherein the vertical axis runs perpendicularly to the contact plane, in particular when the floor cleaning machine is disposed on a floor area to be cleaned.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
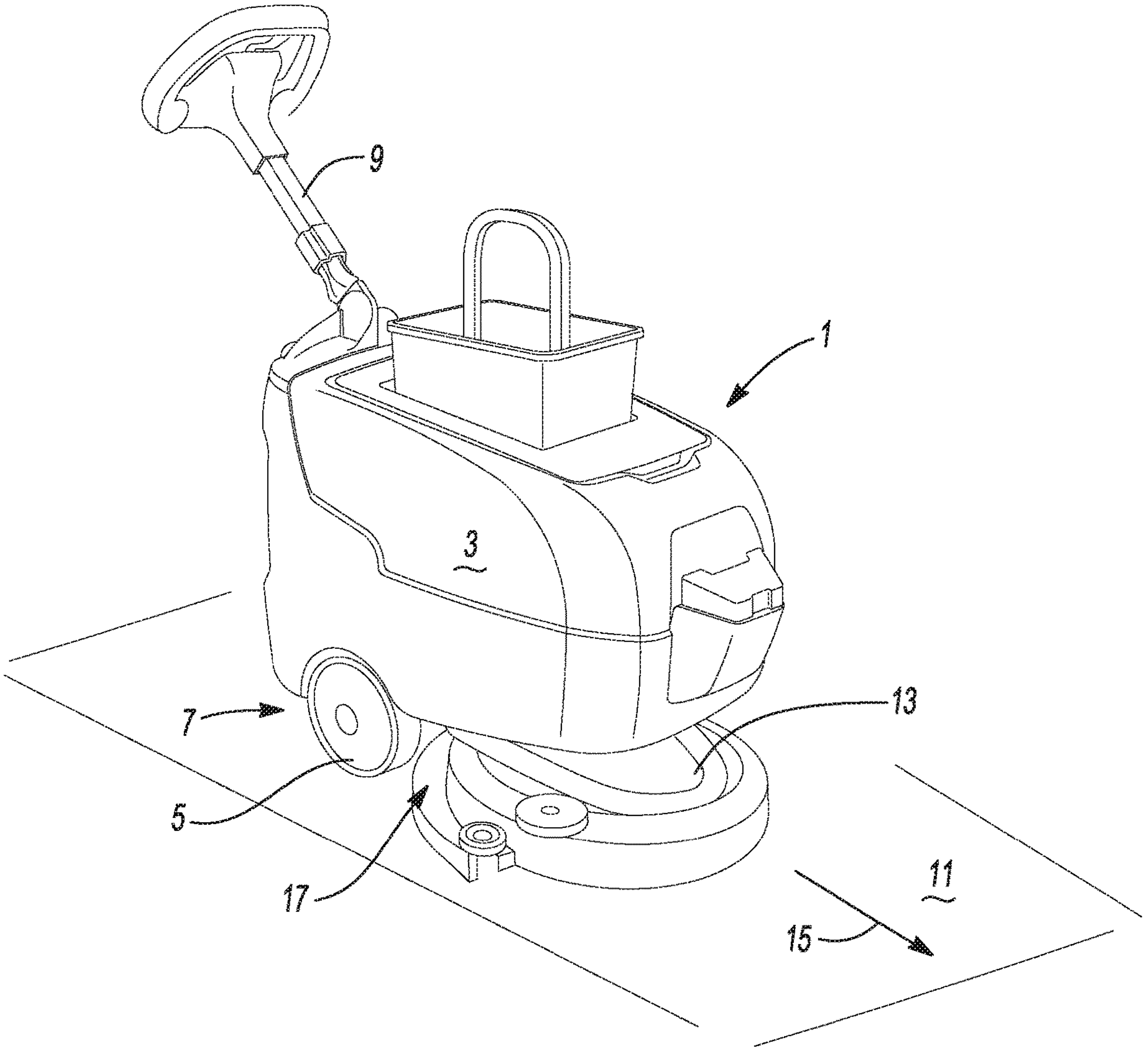
FIG. 1 shows an exemplary embodiment of an exemplary floor cleaning machine according to the present disclosure, having an exemplary embodiment of a suction foot assembly constructed in accordance with the teachings of the present disclosure.

FIG. 1 shows an exemplary embodiment of a floor cleaning machine 1 according to the present disclosure, wherein the latter has a machine housing 3 in which a waste liquid tank and a cleaning liquid tank (both not illustrated) are provided. Moreover, the floor cleaning machine 1 has a running gear 7 which in this exemplary embodiment includes two wheels 5 and by way of which the floor cleaning machine 1 can be moved by a user over a floor area 11 to be cleaned with the aid of an operating bar 9 provided on the machine housing 3.

It can moreover be derived from FIG. 1 that the exemplary embodiment of a floor cleaning machine according to the present disclosure has a scrubbing deck 13 which is mounted on the machine housing 3, wherein an exemplary embodiment of a suction foot assembly 17 according to the present disclosure is provided behind the scrubbing deck 13 when viewed in the normal direction of movement 15 of the floor cleaning machine 1 during operation, as identified by the arrow.

Figure 2:
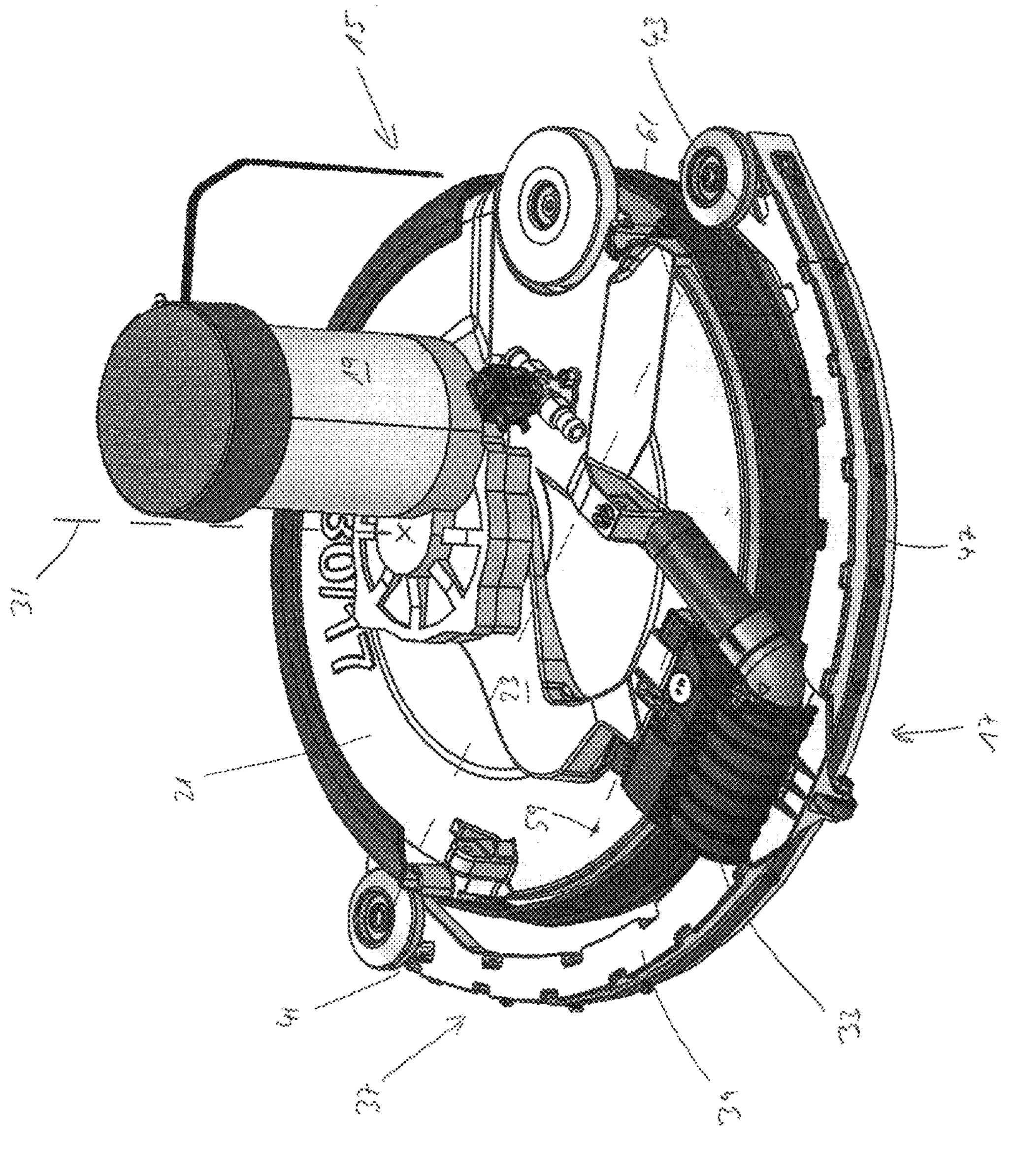
FIG. 2 shows a perspective illustration of the exemplary embodiment of a suction foot assembly according to the teachings of the present disclosure together with a scrubbing deck.

The combination of the scrubbing deck 13 and the suction foot assembly 17 is illustrated in a perspective illustration in FIG. 2. The scrubbing deck 13 has brush elements (not illustrated) which are driven by a motor 19 and which engage with the floor area 11 to be cleaned when the scrubbing deck 13 bears on the floor area 11 to be cleaned. The exemplary embodiment of a suction foot assembly 17 according to the present disclosure, described in detail hereunder, is attached to the housing 21 of the scrubbing deck 13.

Figure 4:
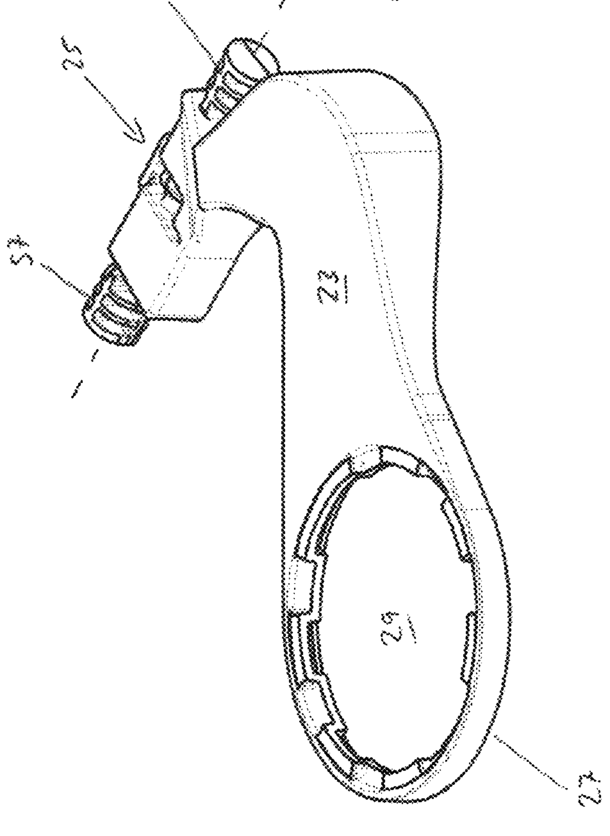
FIG. 4 shows a perspective illustration of the suction foot interface of the exemplary embodiment from FIG. 2.

The exemplary embodiment of a suction foot assembly 17 according to the present disclosure firstly has a suction foot interface 23 which is also illustrated in FIG. 4 and extends between a coupling end 25 and a machine end 27. In the exemplary embodiment described here the suction foot interface 23 on the machine end 27 has a receptacle opening 29 which is designed in such a manner that the latter can be mounted on a receptacle (not illustrated) of the housing 21 of the scrubbing deck 13 so as to be pivotable about a vertical axis 31, wherein the vertical axis 31 runs substantially perpendicularly to the floor area 11 to be cleaned when the floor cleaning machine 1 is in operation and the scrubbing deck 13 bears on the floor area 11 to be cleaned.

Figure 5:
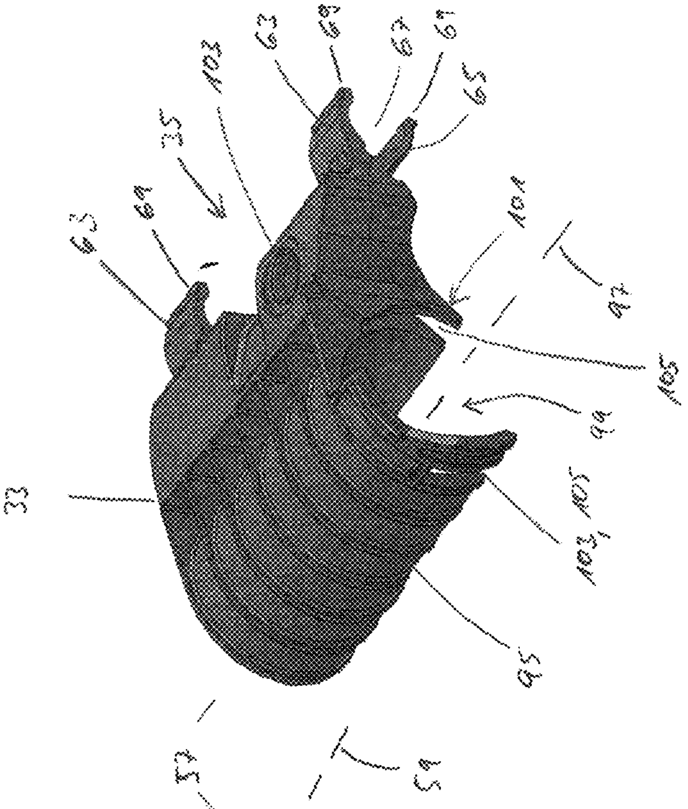
FIG. 5 shows a perspective illustration of the suction foot holder of the exemplary embodiment from FIG. 2.

As can be derived from FIGS. 2 and 5, the suction foot assembly 17 furthermore has a suction foot holder 33 which is illustrated in detail in FIG. 5 and has a coupling portion 35, the latter being releasably and pivotably connected to the coupling end 25 of the suction foot interface 23 in the manner described hereunder.

Figure 3:
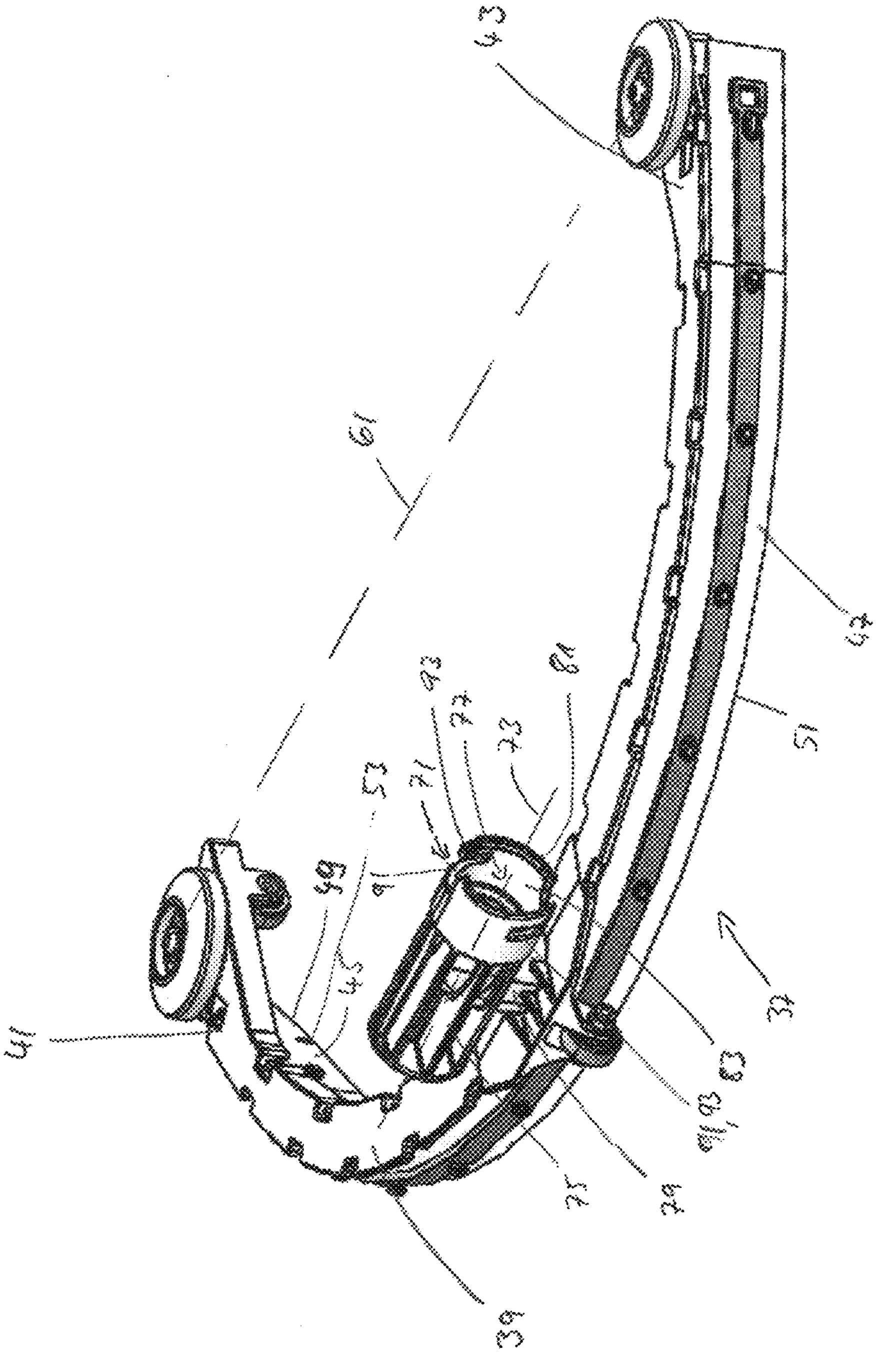
FIG. 3 shows a perspective illustration of part of the exemplary embodiment of a suction foot assembly from FIG. 2.

Finally, the suction foot assembly 17 has a suction foot 37 which is releasably attached to the suction foot holder 33 in a manner yet to be described in more detail hereunder, wherein the suction foot 37, as can be derived from FIGS. 2 and 3, has a base 39 which runs in a curved manner between a first end 41 and a second end 43. Attached to the base 39 are a front suction lip 45 and a rear suction lip 47 which both extend away in a substantially mutually parallel manner from the base 39 and moreover run in each case along the base 39. When the suction foot assembly 17, and thus the suction foot 39, bear on a floor area 11 to be cleaned, the suction lips 45, 47 point from the base 39 towards the floor area 11 to be cleaned, and by way of the lower edge 49, 51 thereof both bear on the floor area 11 to be cleaned, because the lower edges 49, 51 are disposed in a common contact plane. It can furthermore be seen that the front suction lip 47 is configured with slots, i.e., said front suction lip 47 has slots 53 which run from the lower edge 49 towards the base 39 and through which waste liquid located on the floor area 11 to be cleaned can make its way into the suction chamber 55 formed between the sealing lips 45, 47 and the base 39. The sealing lips 45, 47 and the base 39 thus delimit the suction chamber 55.

The connection between the coupling end 25 of the suction foot interface 23 and the coupling portion 35 of the suction foot holder 33 will be described hereunder in particular with reference to FIGS. 4 and 5.

As can be derived in particular from FIG. 4, the coupling end 25 of the suction foot interface 23 has two pin portions 57 which extend along a common pin axis 59 that runs parallel to the contact plane in which the lower edges 49, 51 of the sealing lips 45, 47 extend. Moreover, the pin axis 59 in this exemplary embodiment is disposed so as to be parallel to a connecting line 61 which extends in the contact plane between the ends 41, 43 of the base 39 of the suction foot 37. It can furthermore be derived from FIG. 4 that the pin portions 57 have ribs which, when viewed in cross section, are configured so as to be circular. As a result, the envelope of the pin portions 57 likewise has a circular cross section.

Provided on the coupling portion 35 of the suction foot mounting 33 are first clamping elements 63 and, lying opposite the first clamping elements 63, second clamping elements 65, wherein the pairs of clamping elements 63, 65 are disposed so as to be mutually parallel. The clamping elements 63, 65 are configured in such a manner that said clamping elements 63, 65, when viewed in each case from the opposite clamping element, run concavely such that a receptacle portion 67 is configured between the clamping elements 63, 65 and a free end 69 is joined said receptacle portion 67. Owing to the concave profile of the clamping elements 63, 65, the spacing between said clamping elements 63, 65 in the region of the free ends 69 is less than in the region of the receptacle portion 67. As a result of this construction of the clamping elements 63, 65, and as a result of the suitable choice of the diameter of the pin portions 57, it is possible that the pin portions 57, proceeding from the free ends 69 of the clamping elements 63, can be inserted into the receptacle portions 67, wherein the clamping elements 63, 65 are slightly elastically deformed in the process. Likewise, the pin portions 57 can be pressed out of the receptacle portions 67 when a sufficiently great force perpendicular to the pin axis 57 is exerted on the suction foot mounting 33, or the suction foot 37 connected thereto. As a result of this latching connection between the suction foot holder 33 and the suction foot interface 23 an overload protection is thus implemented in a simple manner such that the suction foot 37 can ultimately be released from the machine housing 3 of the floor cleaning machine 1 when said suction foot 37 contacts an obstacle, so that the suction foot 37 can yield and damage to the suction foot 37 can be avoided.

Since the cross section of the pin portion 57 is furthermore designed so as to be circular, the coupling portion 35 and thus the suction foot holder 33 can be pivoted relative to the suction foot interface 23 about the pin axis 59.

The construction of the connection between the suction foot holder 33 and the base 39 of the suction foot 37 will be described hereunder.

Figure 7:
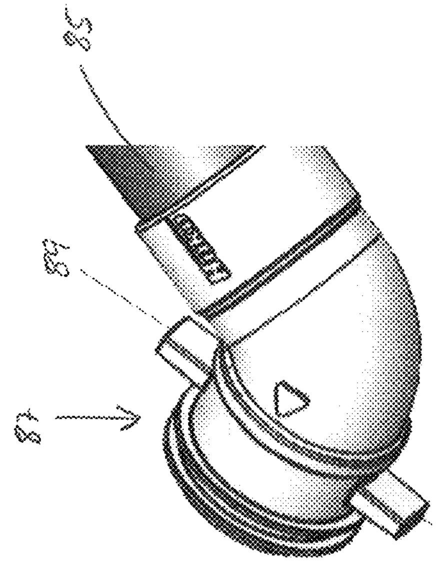
FIG. 7 shows the connector port of the suction connector also of the exemplary embodiment from FIG. 2 in a perspective illustration.

As can be derived from FIG. 3, a plug-in member 71 which extends along a first longitudinal axis 73 is attached to the base 39 of the suction foot 37, wherein the first longitudinal axis 73 runs parallel to the contact plane which is defined by the lower edges 49, 51 of the sealing lips 45, 47. When viewed perpendicularly to the first longitudinal axis 73, the envelope of the plug-in member 71 has a circular cross section because the plug-in member 71 has ribs 75 which extend parallel to the longitudinal axis and extend up to the envelope. The plug-in member 71 is configured as a hollow member and thus has an interior 77, wherein this interior 77 by way of a connecting piece 79 is connected to the suction chamber 55, the latter being delimited by the base 39 and the sealing lips 45, 47. Moreover, the plug-in member 71 on a first end face 81 has a suction connector 83 which is configured in such a manner that a connector port 87 provided on the suction hose 85 can be inserted into said suction connector 83 and be pivoted about the first longitudinal axis 73. As can furthermore be derived from FIG. 7, the connector port 87 of the suction hose 85 has two locking elements 89 which extend away radially from the connector port 87, the function of which is yet to be described hereunder.

Figure 6:
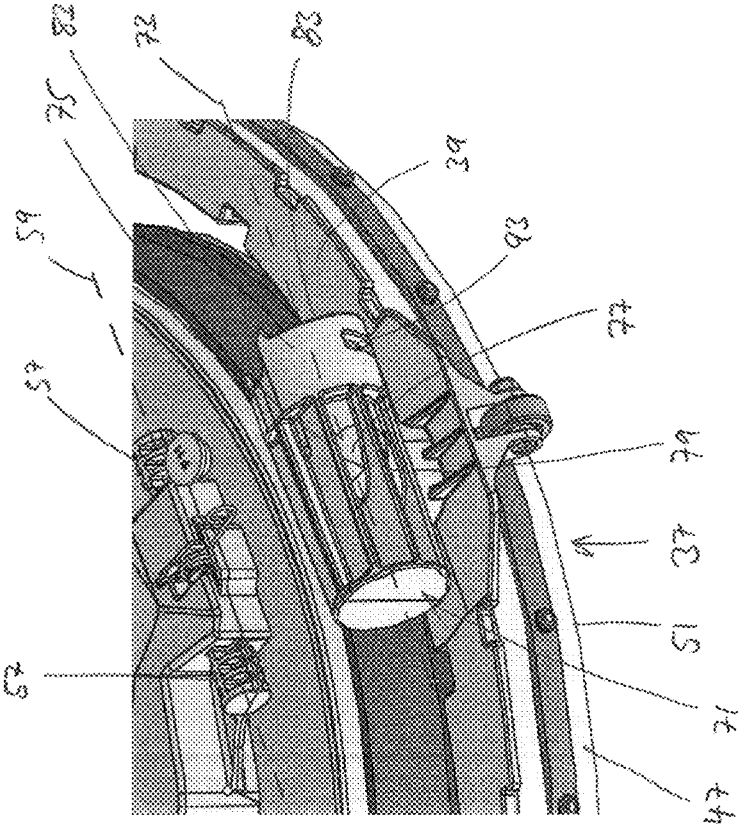
FIG. 6 shows a perspective illustration of part of the suction foot assembly according to the exemplary embodiment from FIG. 2, wherein the suction foot holder is not shown.

It can be derived from FIGS. 3 and 6 that the plug-in member 71 in the region of the suction connector 83 has first slots 91 which are open towards the end face 81 of the plug-in member 71 and have first locking portions 93 that extend in a radial plane running perpendicularly to the first longitudinal axis 73. When the connector port 87 is inserted into the suction connector 83, this can take place in such a manner that the locking elements 89 are inserted into the first slots 91 and the connector port 87 after the insertion movement along the first longitudinal axis 73 is pivoted in such a manner that the locking elements 89 move into the first locking portions 93. The locking elements 89 in the radial direction have such a length that said locking elements 89 extend outwards through the first slots 91, beyond the external side of the plug-in member 71.

It can furthermore be derived from FIG. 5 that the suction foot holder 33 has a holding portion 95 in which a receptacle region 99 extending along a second longitudinal axis 97 is configured, the cross section of said receptacle region 99 perpendicular to the second longitudinal axis 97 being configured in a partially circular manner, wherein the wall about the receptacle region 99 extends across more than 180°, when viewed in cross section. The diameter of the receptacle region 99 here is chosen such that the plug-in member 71 can be received therein such that the latter can be pivoted relative to the holding portion 95, or the suction foot holder 33 about the first longitudinal axis 73, or the second longitudinal axis 97.

Figure 8:
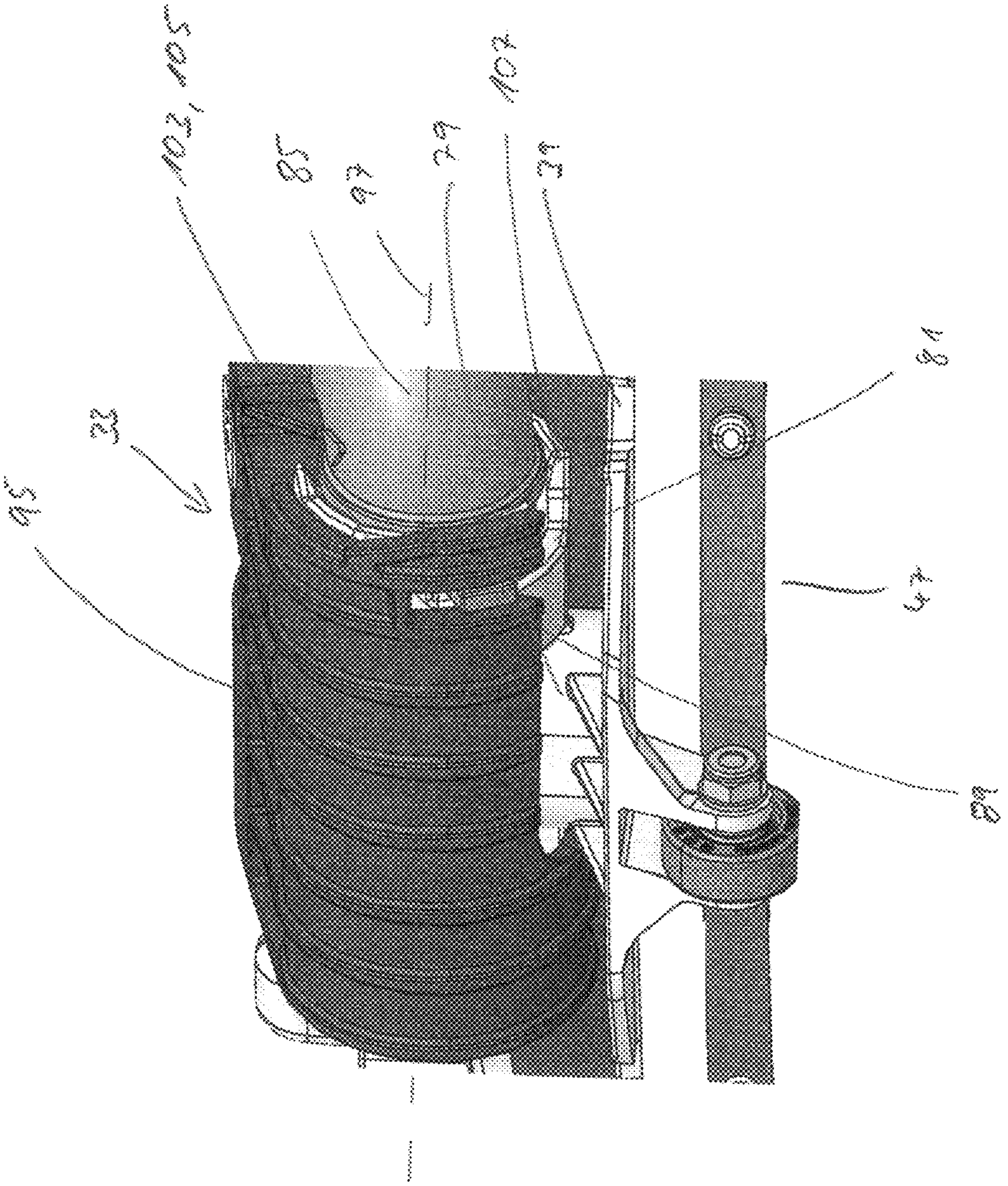
FIG. 8 shows a perspective illustration from below of part of the suction foot of the exemplary embodiment from FIG. 2.

It can finally be seen in FIG. 5 and in FIG. 8 that the holding portion 95, proceeding from a second end face 101, points in the same direction as the first end face 81, has two slots 103 which likewise have second locking portions 105 in a radial plane extending perpendicularly to the second longitudinal axis 97.

When the plug-in member 71 is inserted along the first longitudinal axis 73, or the second longitudinal axis 97, completely into the receptacle region 99 such that the plug-in member 71 is in the inserted position, as is shown in FIGS. 2 and 8, the first and the second slots 91, 103 and in particular the first and the second locking portions 93, 105 overlap one another.

This arrangement of the first and the second slots 91, 103 enables the plug-in member 71 to be coupled to the holding portion 95. When the plug-in member 71 is inserted along the second longitudinal axis 97 into the receptacle region 99 completely up to a detent, the suction hose 85 by way of the connector port 87 is inserted into the suction connector 83 up to a detent, wherein the connector port 87 in the process is pivoted such that the locking elements 89 move into the first and second locking portions 93, 105. In this way, by connecting the suction hose 85 to the suction connector 83 in the plug-in member 71, the connection between the plug-in member 71 and the holding portion 95 is simultaneously locked such that the plug-in member 71 can no longer be moved along the second longitudinal axis 97 out of the holding portion 95. Moreover, the connection between the base 39 of the suction foot 37 and the suction foot holder 33 is also used for establishing the fluidic connection between the suction hose 85 and the suction chamber 55 in the suction foot 37.

In the exemplary embodiment described here the plug-in member 71 is attached to the base 39 of the suction foot 37, while the holding portion 95 is provided on the suction foot holder 33. However, it is also conceivable that the suction foot holder 33 has a plug-in member which in this instance is received in a receptacle region on the base 39 of the suction foot 37. In such an alternative, the receptacle region of the holding portion is connected to the suction chamber, and a suction connector for the suction hose 85 can be provided either on the holding portion or on the plug-in member.

Moreover, it is to be pointed out once again that the concept for mounting a suction foot, in which a plug-in member 71 is inserted into the receptacle region 99 of a holding portion 95, is independent and inventive and is not limited to being used conjointly with the other aspects of the exemplary embodiment of a suction foot assembly described here. Rather, this concept can also be used in other constructions of suction foot assemblies in order to attach the suction foot 37 so as to be releasable and pivotable on a mounting.

Moreover, the connection between the base 39 and the suction foot holder 33 is designed such that the base 39 is pivotable relative to the suction foot holder 33 about the second longitudinal axis 97, the latter running parallel to the pin axis 59 and thus likewise parallel to the contact plane.

It can moreover be seen in FIG. 8 that a detent 107 on which the holding portion 95 can come to bear is provided on the plug-in member 71, as a result of which the pivoting range across which the suction foot 37 can be pivoted relative to the suction foot holder 33 about the second longitudinal axis 97 is delimited. The detent 107 here is configured on the connecting piece 79, and it is achieved by the detent 107 that the suction foot 37, when the front end of the floor cleaning machine 1 is lifted, is prevented from pivoting towards the floor area 11 to be cleaned to such an extent that said suction foot 37 contacts said floor area 11 also in the lifted state of the floor cleaning machine 1, the center of gravity of the suction foot 37 when viewed in the direction of movement 15 lying in front of the pivot axis which is defined by the first longitudinal axis 73 and the second longitudinal axis 97.

In the suction foot assembly 17 according to the exemplary embodiment described above, the suction foot 37 can be attached to the floor cleaning machine 1 in the manner described hereunder, or the suction foot 37 for maintenance and cleaning purposes can be released from the floor cleaning machine 1 in a simple manner.

For assembling the suction foot 37, the plug-in member 71 provided thereon must be inserted along the second longitudinal axis 97 into the receptacle region 99 of the suction foot holder 33 in the manner already described, wherein this is possible in a simple manner when the suction foot interface 23 is pivoted about the vertical axis 31 such that the holding portion 95 of the suction foot holder 33 is disposed in the lateral region of the machine housing 3 of the floor cleaning machine 1. When the plug-in member 71 in the inserted position is disposed in the receptacle region 99 of the suction foot holder 33, the connector port 87 of the suction hose 85 is inserted into the suction connector 83 in the plug-in member 71 in the manner already described, as a result of which the plug-in member 71, by virtue of the engagement of the locking elements 89 with the locking portions 93, 105 in the slots 91, 103, is also locked axially relative to the suction foot holder 33. The slots 91, 103 here are designed such that the locking elements 89 in the locked state are substantially horizontally aligned. In the event of tensile forces which may act in the suction hose 85, an extraction of the connector port 87 from the suction connector 83 is thus reliably avoided.

In the exemplary embodiment described here, the suction hose 85 is guided in a loop about the motor 19 of the scrubbing deck 13, and the other end of said suction hose 85 leads to the waste liquid tank of the floor cleaning machine 1.

If the suction foot 37 should contact an obstacle during the operation of the floor cleaning machine 1 in which the latter is moved over a floor area 11 to be cleaned, such that forces along the direction of movement 15 are exerted on said suction foot 37, the clamping elements 63, 65 can release themselves from the pin portions 57, and there is no risk of damage to the suction foot 37. An overload protection is thus in particular formed by the latching engagement between the clamping elements 63, 65 and the pin portions 57.

Since the suction foot 37 per se is mounted so as to be pivotable relative to the suction foot holder 33 about the first longitudinal axis 73 or the second longitudinal axis 97, and the suction foot holder 33 on the other hand is mounted on the suction foot interface 23 so as to be pivotable about the pin axis 59, the suction foot 37 can assume different vertical positions relative to the housing 21 of the scrubbing deck 13, depending on the wear of the cleaning elements in the scrubbing deck 13, wherein the contact plane in each of these positions can be aligned parallel to the floor area 11 to be cleaned.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

| List of Reference Signs | |
|---|---|
| 1 | Floor cleaning machine |
| 3 | Machine housing |
| 5 | Wheel |
| 7 | Running gear |
| 9 | Operating bar |
| 11 | Floor area to be cleaned |
| 13 | Scrubbing deck |
| 15 | Direction of movement |
| 17 | Suction foot assembly |
| 19 | Motor (scrubbing deck) |
| 21 | Housing (scrubbing deck) |
| 23 | Suction foot interface |
| 25 | Coupling end |
| 27 | Machine end |
| 29 | Receptacle opening |
| 31 | Vertical axis |
| 33 | Suction foot holder |
| 35 | Coupling portion |
| 37 | Suction foot |
| 39 | Base |
| 41 | First end of suction foot |
| 43 | Second end of suction foot |
| 45 | Front sealing lip |
| 47 | Rear sealing lip |
| 49 | Lower edge of front sealing lip |
| 51 | Lower edge of rear sealing lip |
| 53 | Slot |
| 55 | Suction chamber |
| 57 | Pin portion |
| 59 | Pin axis |
| 61 | Connecting line |
| 63 | First clamping element |
| 65 | Second clamping element |
| 67 | Receptacle portion |
| 69 | Free end of clamping element |
| 71 | Plug-in member |
| 73 | First longitudinal axis |
| 75 | Rib |
| 77 | Interior |
| 79 | Connecting piece |
| 81 | First end face |
| 83 | Suction connector |
| 85 | Suction hose |
| 87 | Connector port |
| 89 | Locking element |
| 91 | First slot |
| 93 | Second locking portion |
| 95 | Holding portion |
| 97 | Second longitudinal axis |
| 99 | Receptacle region |

-continued

| List of Reference Signs | |
| --- | --- |
| 101 | Second end face |
| 103 | Second slot |
| 105 | Second locking portion |
| 107 | Detent |

What is claimed is:

1. A suction foot assembly for attaching to a floor cleaning machine, having a suction foot having a base to which are attached a front suction lip and a rear suction lip which, extend away from the base and are mutually spaced apart in such a manner that a suction chamber is delimited by the suction lips and the base, wherein the edges of the suction lips that are distal from the base extend in a contact plane and are configured to bear on a floor area to be cleaned;

having a suction foot holder which is connected to the base and has a coupling portion;

having a suction foot interface which extends between a coupling end and a machine end;

wherein the machine end is configured to be attached to a floor cleaning machine;

wherein one of the coupling portion and the coupling end has a pin portion which extends along a pin axis that runs parallel to the contact plane;

wherein the other of the coupling portion and the coupling end has a first clamping element and a second clamping element which are mutually opposite, have free ends and run concavely in such a manner that a receptacle portion in which the pin portion is received is formed between the clamping elements;

wherein the mutual spacing of the free ends of the clamping elements is less than the spacing of the clamping elements in the receptacle portion;

wherein one or both clamping elements is/are elastically deformable in such a manner that the pin portion can be moved, perpendicularly to the direction of extent of the latter, by way of the free ends out of the receptacle portion and into the latter;

wherein a plug-in member which extends along a first longitudinal axis is attached to one of the base and the suction foot holder, and wherein on the other of the base and the suction foot holder is provided a holding portion in which a receptacle region is configured;

wherein the plug-in member is received in the receptacle region and is in an inserted position;

wherein the receptacle region is designed so that the latter extends along a second longitudinal axis;

wherein the second longitudinal axis runs parallel to the contact plane; and wherein the plug-in member and the receptacle region are designed in such a manner that the plug-in member for receiving in the receptacle region is able to be inserted into the receptacle region along the second longitudinal axis up to the inserted position, wherein the first longitudinal axis and the second longitudinal axis coincide along all points of the first longitudinal axis and all points of the second longitudinal axis, and the plug-in member in the inserted position is pivotable relative to the holding portion about the second longitudinal axis.

2. The suction foot assembly according to claim 1, wherein the pin portion and the receptacle portion are configured in such a manner that the pin portion is pivotable relative to the clamping elements about the pin axis.

3. The suction foot assembly according to claim 1, wherein the pin portion is provided on the coupling end, and the first clamping element and the second clamping element are provided on the coupling portion.

4. The suction foot assembly according to claim 1, wherein the base extends from a first end to a second end, and wherein the pin axis runs parallel to a connecting line, extending parallel to the contact plane, between the ends of the base.

5. The suction foot assembly according to claim 1, wherein the second longitudinal axis and the pin axis are mutually spaced apart and parallel.

6. The suction foot assembly according to claim 1, wherein the plug-in member has an interior, wherein one of the interior and the receptacle region is connected to the suction chamber; and wherein the other one of the interior and the receptacle region is connected to a suction connector for a suction hose, which is provided on the plug-in member or the holding portion, and in the inserted position the receptacle region is connected to the interior.

7. The suction foot assembly according to claim 1, wherein the plug-in member is provided on the base, and the interior is connected to the suction chamber; and wherein the plug-in member has a suction connector which is connected to the interior.

8. The suction foot assembly according to claim 7, wherein the suction connector is disposed on a first end face of the plug-in member that extends perpendicularly to the first longitudinal axis.

9. The suction foot assembly according to claim 8, having a suction hose having connector port, wherein the suction hose is configured to be connected indirectly or directly to a waste liquid tank of a floor cleaning machine;

wherein the connector port and the suction connector are designed so that the connector port can be inserted into the suction connector, and in the inserted state can be pivoted relative to the suction connector about the first longitudinal axis;

wherein the plug-in member on the suction connector has a first slot which extends through a wall of the plug-in member and which has a first locking portion that runs in a radial plane in relation to the first longitudinal axis;

wherein the first slot towards the first end face has a first opening;

wherein the holding portion has a second slot which is open towards a second end face on the holding portion, wherein the second end face points in the same direction as the first end face, and which has a second locking portion that runs in a radial plane in relation to the second longitudinal axis;

wherein the first locking portion and the second locking portion overlap one another when the plug-in member is in the inserted position;

wherein the connector port has a locking element which extends radially away therefrom; and wherein the slots are designed in such a manner that the locking element, when inserting the connector port into the suction connector, by displacing and pivoting the connector port relative to the suction connector can be moved into the first locking portion and the second locking portion.

10. The suction foot assembly according to claim 1, wherein the front and rear suction lips extend away from the base in a mutually parallel manner.

11. The suction foot assembly according to claim 1, wherein the machine end of the suction foot interface is pivotable relative to the floor cleaning machine about a vertical axis.

12. The suction foot assembly according to claim 1, wherein the plug-in member has an interior, wherein one of the interior and the receptacle region is connected to the suction chamber; and wherein the one of the interior and the receptacle region is connected to a suction connector for a suction hose, which is provided on the plug-in member or the holding portion.

13. The suction foot assembly according to claim 12, wherein the one of the suction connector is connected to the interior the plug-in member is in the inserted position.

14. A floor cleaning machine having a running gear with wheels, so that the running gear is designed to be moved across a floor area to be cleaned, and having a machine housing;

wherein provided on the machine housing is a scrubbing deck having cleaning elements for engaging with the floor area to be cleaned; and a suction foot assembly that includes a base, front and rear suction lips, a suction foot holder, and a suction foot interface, the front and rear suction lips being attached to and extending away from the base, the front and rear suction lips being mutually spaced apart and cooperating with the base to delimit a suction chamber, the front and rear suction lips having respective edges that are distal from the base and which extend in a contact plane, the front and rear suction lips being configured to bear on a floor area to be cleaned, the suction foot holder being connected to the base and having a coupling portion, the suction foot interface extending between a coupling end and a machine end, wherein the machine end is coupled to the machine housing;

wherein one of the coupling portion and the coupling end has a pin portion which extends along a pin axis that runs parallel to the contact plane;

wherein the other of the coupling portion and the coupling end has a first clamping element and a second clamping element which are mutually opposite, have free ends and run concavely in such a manner that a receptacle portion in which the pin portion is received is formed between the clamping elements;

wherein the mutual spacing of the free ends of the clamping elements is less than the spacing of the clamping elements in the receptacle portion; and wherein one or both clamping elements is/are elastically deformable in such a manner that the pin portion can be moved, perpendicularly to the direction of extent of the latter, by way of the free ends out of the receptacle portion and into the latter.

15. The floor cleaning machine according to claim 14, wherein the machine end is mounted on the machine housing or the scrubbing deck so as to be pivotable about a vertical axis, wherein the vertical axis runs perpendicularly to the contact plane when the floor cleaning machine is disposed on a floor area to be cleaned.

* * * * *